F. M. GREEN AND S. D. HERON.
GEARING FOR CONNECTING COAXIAL SHAFTS.
APPLICATION FILED JULY 22, 1918.

1,347,220.

Patented July 20, 1920.

3 SHEETS—SHEET 1.

INVENTORS.
F.M.Green & S.D.Heron.

F. M. GREEN AND S. D. HERON.
GEARING FOR CONNECTING COAXIAL SHAFTS.
APPLICATION FILED JULY 22, 1918.

1,347,220.

Patented July 20, 1920.
3 SHEETS—SHEET 3.

INVENTORS.
F. M. Green & S. D. Heron.
per Robert Phillips.
Attorney.

UNITED STATES PATENT OFFICE.

FREDERICK MICHAEL GREEN AND SAM DALZIEL HERON, OF PARKSIDE, COVENTRY, ENGLAND, ASSIGNORS TO SIDDELEY-DEASY MOTOR CAR COMPANY LIMITED, OF PARKSIDE, COVENTRY, ENGLAND.

GEARING FOR CONNECTING COAXIAL SHAFTS.

1,347,220.  Specification of Letters Patent.  Patented July 20, 1920.

Application filed July 22, 1918. Serial No. 246,209.

*To all whom it may concern:*

Be it known that we, FREDERICK MICHAEL GREEN and SAM DALZIEL HERON, both subjects of the King of Great Britain and Ireland, residing at Parkside, Coventry, in the county of Warwick, England, have invented certain new and useful Improvements in Gearing for Connecting Coaxial Shafts, of which the following is a full and complete specification.

This invention relates to gearing of the spur wheel type for connecting co-axially arranged shafts, and particularly to that type which provides for a considerable difference between the relative speeds of said shafts.

A common form of this type of gear comprises a spur wheel fixed on the driving shaft which meshes with a spur pinion running loosely on a fixed intermediate axle, and a spur pinion fixed on the driven shaft which meshes with a spur wheel running loosely on the fixed intermediate axle said pinion and wheel on the intermediate axle being permanently coupled together.

It is usual in this type of gear to employ a plurality of intermediate gears in order not only to distribute the power but also to balance the strains set up by the gear. This however gives rise to another difficulty, viz:—locating the teeth of the pinions and of the wheels of the intermediate gears in such relation to one another that all the wheels of the gear take an equal part in the transmission of the power through the gear.

The object of the present invention is to overcome this difficulty which we attain by mounting the spur pinion and wheel of each intermediate gear independently of one another and connecting them, by means of an automatic friction clutch which is brought into action by centrifugal force. A further object of this invention is to prevent damage to the gearing from sudden overloading.

We attain these ends by the interposition of automatic clutches of the centrifugal type between the pinions and wheels of the intermediate gears.

In the accompanying drawing which illustrates a gear of the type specified which provides for a considerable difference in the relative speeds of the two shafts:—

Figure 1:
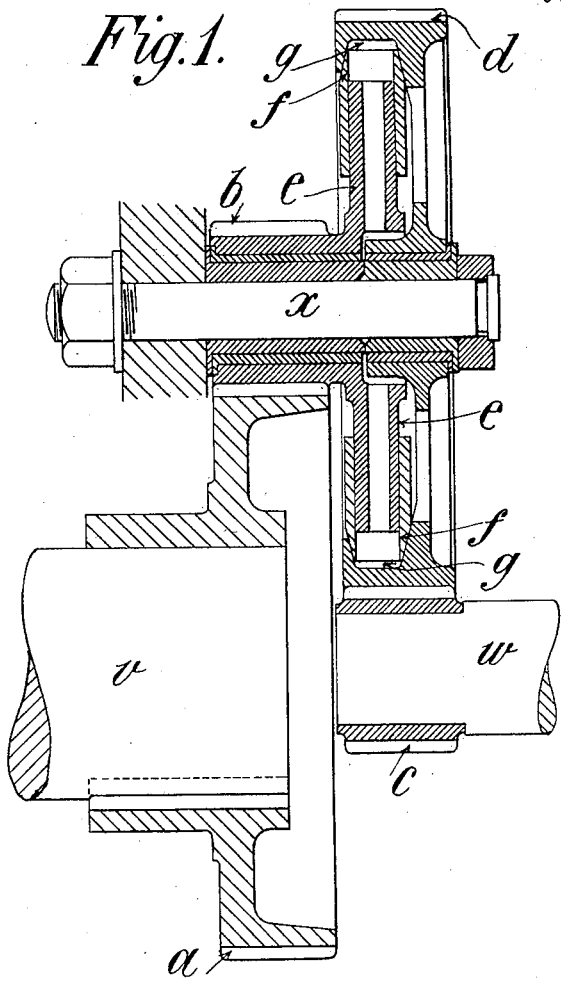
Figure 2:
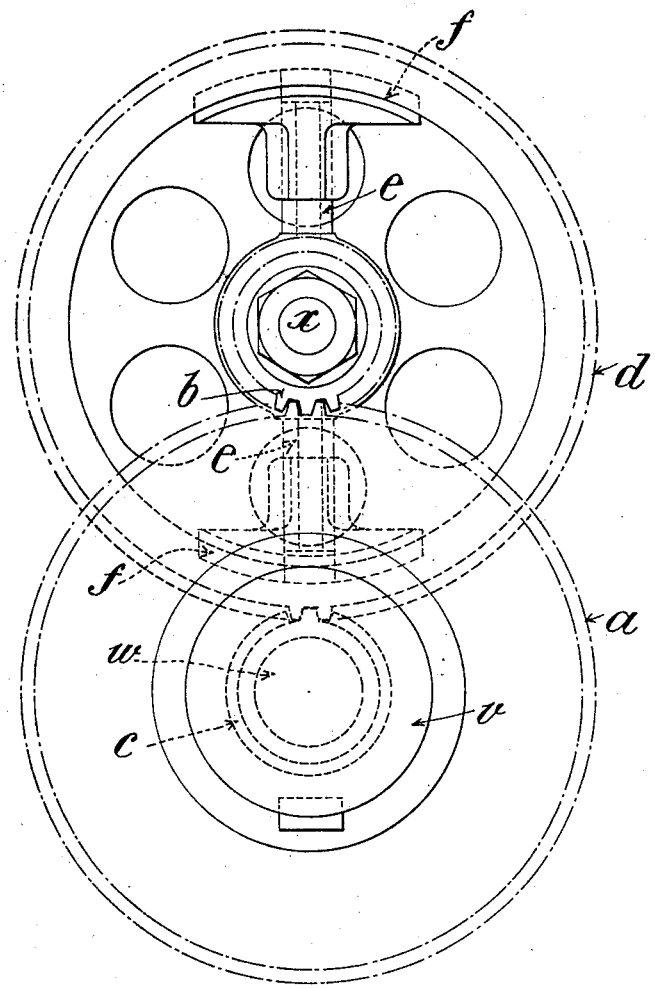
Figure 3:
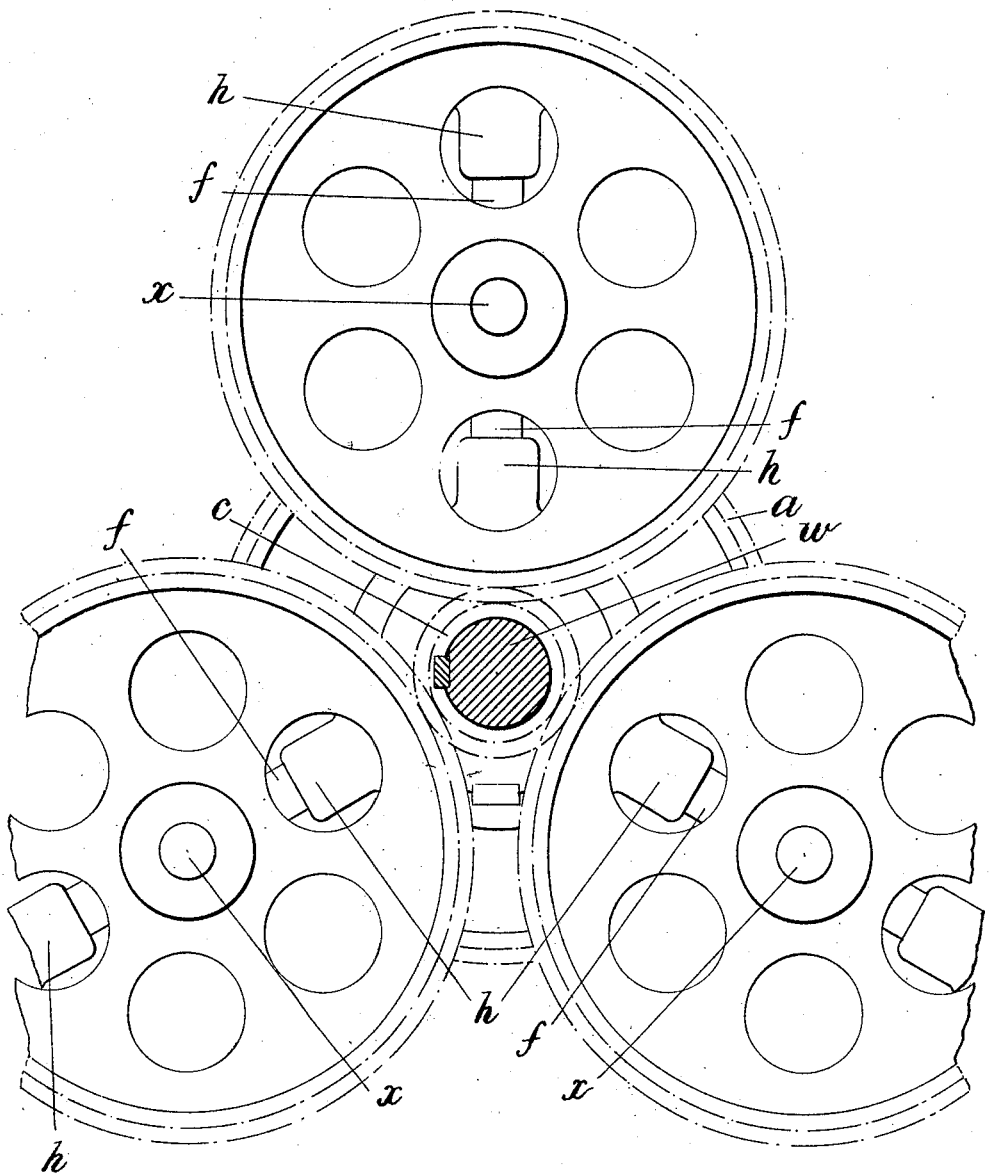

Figure 1 is a view in longitudinal section. Fig. 2 is a view in end elevation in which for distinctness only one intermediate gear is shown, and Fig. 3 is an end view showing the relative positions of the driven shaft and the intermediate shafts.

In all the views similar parts are marked with like letters of reference.

The spur wheel $a$ on the driving shaft $v$, the spur pinion $b$ on each of the stationary intermediate axles $x$, and the spur pinion $c$ on the driven shaft $w$ are all of the usual construction. The spur wheels $d$ on the intermediate axles $x$ are not directly or positively connected to the spur pinions $b$ as is usual but are free to rotate independently of said pinions.

On the boss of each of the pinions $b$ are mounted a plurality of radially arranged arms $e$ on each of which is mounted so as to slide radially thereon a segmental clutch piece $f$ the periphery of which is shaped to adapt it to engage with a groove $g$ in the inner face of the adjacent spur wheel $d$. The engaging faces of the block and groove are preferably tapered or coned to increase the grip and said faces may be faced with any suitable friction material.

These clutches not only enable the power to be equally distributed between all the intermediate gears but they also provide for a certain amount of slip between the driving and driven shafts which prevents the gearing from damage arising from sudden overloads, such for instance as may be caused by rapid acceleration or deceleration of the driving member.

What we claim as our invention and desire to secure by Letters Patent is:—

1. A gearing for coupling co-axially arranged shafts comprising a spur wheel on each of said shafts, a plurality of stationary intermediate axles arranged in parallel relation to the co-axially arranged shafts, two spur wheels on each of said intermediate axles, said wheels gearing respectively with the spur wheels on the co-axially arranged shafts, and automatic clutches which operate by centrifugal action to effect a couple between the two spur wheels on each of the intermediate axles.

2. In a gearing for connecting co-axially arranged shafts, the combination of a spur wheel fixed on the driving shaft, a spur wheel fixed on the driven shaft, a plurality of stationary intermediate axles, two spur wheels mounted to rotate freely on each of said intermediate axles, one of which gears with the spur wheel on the driving shaft and the other of which gears with the spur wheel on the driven shaft, a plurality of radially arranged arms carried by one of the spur wheels on each intermediate axle, segmental pieces mounted to slide on said radial arms, and flanges formed on the other spur wheel on each intermediate axle with which said segmental pieces automatically engage by centrifugal action.

3. In a gearing for connecting co-axially arranged shafts, the combination of a spur wheel fixed on the driving shaft, a spur wheel fixed on the driven shaft, a plurality of stationary intermediate axles arranged in parallel alinement with the co-axial shafts, two spur wheels on each intermediate axle which gear respectively with the spur wheel on the driving shaft and the spur wheel on the driven shaft, a plurality of radially arranged arms carried by one spur wheel of each pair on the intermediate axles, segmental pieces mounted to slide on said radial arms and flanges—for said segmental pieces to engage with—formed on the other spur wheel of each pair on the intermediate axles.

4. In a gearing for connecting co-axially arranged shafts, the combination of a spur wheel fixed on the driving shaft, a spur pinion fixed on the driven shaft, a plurality of stationary intermediate axles, a spur pinion mounted to rotate freely on each of said intermediate axles and mesh with the spur wheel on the driving shaft, a spur wheel mounted to rotate freely on each of the intermediate axles and mesh with the spur pinion on the driven shaft, a plurality of radially arranged arms carried by each of the spur pinions on the intermediate axles, segmental pieces mounted to slide on said radial arms and automatically engage the spur wheels on the intermediate axles by centrifugal action.

5. In a gearing for connecting co-axially arranged shafts, the combination of a spur wheel $a$ fixed on the driving shaft $v$, a spur pinion $c$, fixed on the driven shaft $w$, a plurality of fixed intermediate axles $x$ arranged in parallel alinement with the co-axial shafts $v$ and $w$, spur pinions $b$ on said intermediate axles which gear with the spur wheel $a$ on the driving shaft, spur wheels $d$ on said intermediate axles which gear with the spur pinion $c$ on the driven shaft, a plurality of radially arranged arms $e$ carried by each of the spur pinions on the intermediate axles, segmental pieces $f$ mounted to slide on said radial arms the periphery of said pieces being tapered or coned, and tapered or coned internal grooves $g$ formed in the spur wheels $d$ on the intermediate axles with which said segmental pieces $f$ automatically engage by centrifugal action.

In testimony whereof we have signed our names.

FREDERICK MICHAEL GREEN.
SAM DALZIEL HERON.